(12) United States Patent
Matsunobu et al.

(10) Patent No.: US 12,163,002 B2
(45) Date of Patent: *Dec. 10, 2024

(54) METHOD FOR PRODUCING OLEFINIC RESIN POROUS MATERIAL

(71) Applicants: PRIME PLANET ENERGY & SOLUTIONS, INC., Tokyo (JP); Fukuoka Institute of Technology, Fukuoka (JP)

(72) Inventors: Kohei Matsunobu, Toyota (JP); Kiyoshi Matsuyama, Fukuoka (JP)

(73) Assignees: PRIME PLANET ENERGY & SOLUTIONS, INC., Tokyo (JP); FUKUOKA INSTITUTE OF TECHNOLOGY, Fukuoka (JP)

(*) Notice: Subject to any disclaimer, the term of this patent is extended or adjusted under 35 U.S.C. 154(b) by 193 days.

This patent is subject to a terminal disclaimer.

(21) Appl. No.: 17/575,313

(22) Filed: Jan. 13, 2022

(65) Prior Publication Data

US 2022/0243024 A1   Aug. 4, 2022

(30) Foreign Application Priority Data

Jan. 29, 2021   (JP) .................................. 2021-012984

(51) Int. Cl.
 *C08J 9/12*   (2006.01)
 *B01J 3/00*   (2006.01)

(52) U.S. Cl.
 CPC ............... *C08J 9/122* (2013.01); *B01J 3/008* (2013.01); *C08J 2323/04* (2013.01); *C08J 2323/10* (2013.01)

(58) Field of Classification Search
 CPC .... C08J 9/122; C08J 2323/04; C08J 2323/10; C08J 2203/06; C08J 2323/06;
 (Continued)

(56) References Cited

U.S. PATENT DOCUMENTS

| 4,464,484 A | 8/1984 | Yoshimura et al. |
| 5,051,183 A | 9/1991 | Takita et al. |

(Continued)

FOREIGN PATENT DOCUMENTS

| CN | 101267934 A | 9/2008 |
| CN | 102115561 A | 7/2011 |

(Continued)

OTHER PUBLICATIONS

"Effect of alcohols-regulated crystallization on foaming process and cell morphology of polypropylene," The Journal of Supercritical Fluids, 175 (2021) 105271, by Gao et al., (Year: 2021).*

*Primary Examiner* — Frances Tischler

(74) *Attorney, Agent, or Firm* — Finnegan, Henderson, Farabow, Garrett and Dunner LLP

(57) ABSTRACT

A novel method for producing an olefinic resin porous material is provided. The method for producing an olefinic resin porous material disclosed herein includes the steps of preparing a single phase in which an olefinic resin and a solvent are mixed each other, in a pressure-resistant container, introducing high pressure carbon dioxide into the (Continued)

pressure-resistant container, and releasing the pressure in the pressure-resistant container. In this method, introducing the high pressure carbon dioxide is carried out such that the pressure in the pressure-resistant container reaches 6 MPa or higher.

4 Claims, 8 Drawing Sheets

(58) Field of Classification Search
CPC ...... C08J 2323/12; C08J 2203/08; C08J 9/08; B01J 3/008; Y02P 20/54
See application file for complete search history.

(56) References Cited

U.S. PATENT DOCUMENTS

| | | | |
|---|---|---|---|
| 5,110,998 | A | 5/1992 | Muschiatti |
| 6,375,876 | B1 | 4/2002 | Kessler et al. |
| 2006/0103055 | A1* | 5/2006 | Hoshuyama ......... B01D 67/003 264/479 |
| 2009/0181295 | A1 | 7/2009 | Usami et al. |
| 2011/0305940 | A1 | 12/2011 | Usami et al. |
| 2013/0046040 | A1* | 2/2013 | Srinivasan ................ C08J 9/24 526/159 |
| 2016/0009887 | A1 | 1/2016 | Fukuzawa |
| 2016/0280876 | A1* | 9/2016 | Strey ..................... C08J 9/0014 |

FOREIGN PATENT DOCUMENTS

| | | |
|---|---|---|
| CN | 102924742 A | 2/2013 |
| CN | 105001512 A | 10/2015 |
| CN | 105008443 A | 10/2015 |
| CN | 112210113 A | 1/2021 |
| EP | 0442346 A1 | 8/1991 |
| JP | S 59-111823 A | 6/1984 |
| JP | H-04215210 A | 8/1992 |
| JP | 06-104736 B2 | 12/1994 |
| JP | 2008-231194 A | 10/2008 |
| JP | 2009-527633 A | 7/2009 |
| JP | 2010-248337 A | 11/2010 |
| JP | 2013-531083 A | 8/2013 |
| JP | 2014-005365 A | 1/2014 |
| JP | 2016-113546 A | 6/2016 |
| JP | 2016-176061 A | 10/2016 |
| JP | 2016-540850 A | 12/2016 |
| JP | 2002-535114 A | 10/2022 |
| KR | 10-2016-0086833 A | 7/2016 |
| WO | WO 99/48959 A1 | 9/1999 |
| WO | WO 2007/098339 A2 | 8/2007 |
| WO | WO 2011/140053 A1 | 11/2011 |

* cited by examiner

METHOD FOR PRODUCING OLEFINIC RESIN POROUS MATERIAL

BACKGROUND OF THE INVENTION

1. Field of the Invention

The present disclosure relates to a method for producing an olefinic resin porous material. This application claims the benefit of foreign priority to Japanese Patent Application No. 2021-012984, filed on Jan. 29, 2021, the entire contents of which are incorporated herein by reference.

2. Description of the Related Art

Olefinic resin porous films are excellent in electric characteristics, mechanical characteristics, chemical resistance, and the like. Thus, olefinic resin porous films are used for various applications such as electric materials, various filters, breathable-waterproof garments, packaging materials, and the like. Especially in recent years, olefinic resin porous films are suitably used as battery separators.

Olefinic resin porous materials are generally produced as porous films by stretching methods. Examples of specifically known stretching methods include a wet stretching method including forming a gel sheet from an olefinic resin solution and stretching the gel sheet, and a dry stretching method including forming a sheet body from an olefinic resin and stretching the sheet body to form pores. Other examples of methods for producing olefinic resin porous materials include mixed extraction methods including mixing a pore-forming agent into an olefinic resin to be microdispersed and extracting the pore-forming agent, and a sintering method including heat-fusing polyolefinic resin particles (for example, see Japanese Examined Patent Publication No. H06-104736, Japanese Patent Application Publication No. 2009-527633, and Japanese Patent Application Publication No. 2016-176061).

SUMMARY OF THE INVENTION

The porous structure (for example, pore shape and pore dimension, porosity, thickness of resin skeletons, and the like) of an olefinic resin porous material is limited to some extent by a production method thereof. Therefore, the characteristics of the olefinic resin porous material are limited to some extent, and as a result, the uses of the olefinic resin porous material are limited to some extent. In addition, only a porous film can be obtained by a general stretching method. Accordingly, a novel method for producing an olefinic resin porous material is useful because the applications of olefinic resin porous materials can be expanded, or a high-performance olefinic resin porous material can be provided in the existing applications.

Accordingly, an object of the present disclosure is to provide a novel method for producing an olefinic resin porous material.

The method for producing an olefinic resin porous material disclosed herein includes the steps of preparing a single phase in which an olefinic resin and a solvent are mixed each other, in a pressure-resistant container, introducing high pressure carbon dioxide into the pressure-resistant container, and releasing the pressure in the pressure-resistant container. In this method, introducing the high pressure carbon dioxide is carried out such that the pressure in the pressure-resistant container reaches 6 MPa or higher. Due to this constitution, a novel method for producing an olefinic resin porous material is provided.

In a desired embodiment of the method for producing an olefinic resin porous material disclosed herein, the high pressure carbon dioxide introduced in the pressure-resistant container is carbon dioxide in a supercritical state.

In a desired embodiment of the method for producing an olefinic resin porous material disclosed herein, the olefinic resin is polyethylene or polypropylene.

In a desired embodiment of the method for producing an olefinic resin porous material disclosed herein, the solvent is n-pentane.

From another aspect, an olefinic resin porous material disclosed herein includes an olefinic resin skeleton and pores communicating with one another in the skeleton. The skeleton and the pores have an intertwined structure based on a modulated structure. The olefinic resin skeleton has a three-dimensional network structure. The pores have a three-dimensional network structure.

From another aspect, an olefinic resin porous material disclosed herein includes an olefin resin skeleton based on a sea phase in a sea-island structure and bubble-shaped pores based on an island phase. Adjacent pores in the bubble-shaped pores may be joined.

From another aspect, an olefinic resin porous material disclosed herein includes an olefinic resin skeleton and pores communicating with one another in the skeleton. The olefinic resin skeleton is formed by primary particles of an olefinic resin joining one another to form secondary particles and the secondary particles joining one another.

From another aspect, an olefinic resin porous material disclosed herein includes a skeleton in which spongy olefinic resin particulate bodies join one another.

DESCRIPTION OF THE PREFERRED EMBODIMENTS

Figure 1:
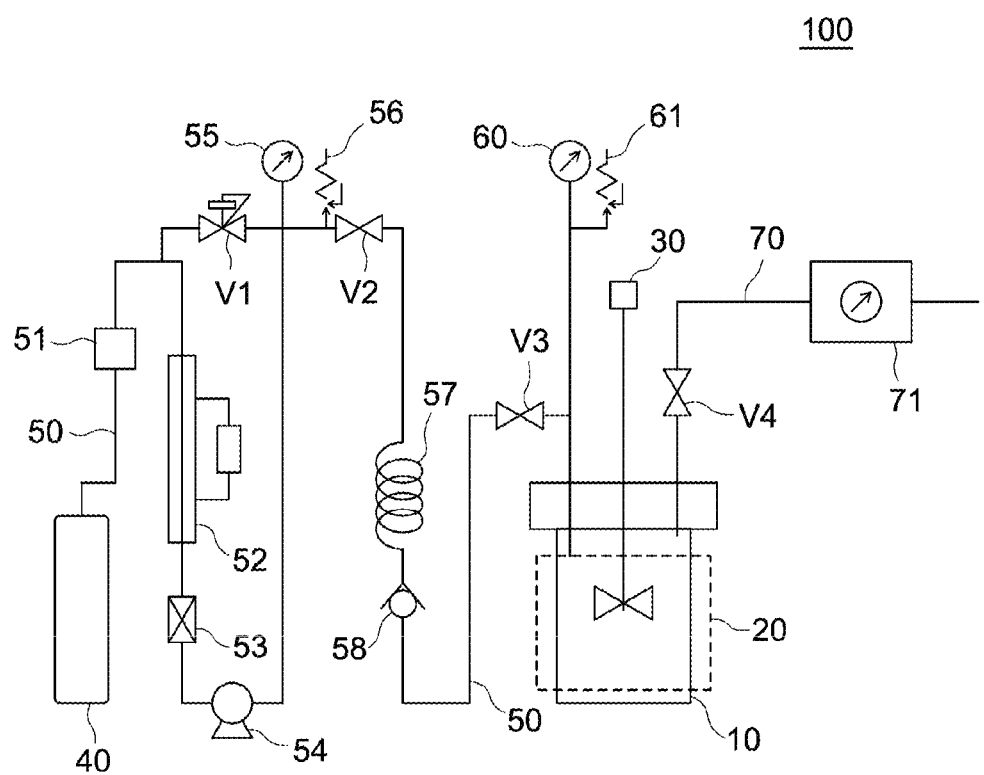
FIG. 1 is a diagram schematically illustrating a production system of an olefinic resin porous material suitable for the production method according to the present disclosure.

The method for producing an olefinic resin porous material of the present disclosure includes a step of preparing a single phase in which an olefinic resin and a solvent are mixed each other, in a pressure-resistant container (hereinafter also referred to as the "mixture phase preparation step"), a step of introducing high pressure carbon dioxide ($CO_2$) into the pressure-resistant container (hereinafter also referred to as the "carbon dioxide introduction step"), and a step of releasing the pressure in the pressure-resistant container (hereinafter also referred to as the "pressure release step"). In this method, introducing the high pressure carbon dioxide is carried out such that the pressure in the pressure-resistant container reaches 6 MPa or higher.

First, the mixture phase preparation step is described. A pressure-resistant container that is resistant to pressures exceeding 6 MPa is used as the pressure-resistant container. A pressure-resistant container that is resistant to pressures exceeding 6 MPa is known, and a known pressure-resistant container may be used in the present disclosure. The pressure-resistant container may be made of stainless steel, a nickel alloy, a fluorine resin, or the like. Specific examples of pressure-resistant containers include an autoclave, a pressure tank, a pressure chamber, or the like. The dimension of the interior of the pressure-resistant container may be selected, as appropriate, depending on the dimension of an olefinic resin porous material to be obtained.

The olefinic resin used herein is a polymer containing alkene units as monomer units. Examples of alkene units include ethylene units, propylene units, 1-butene units, 1-pentene units, 3-methyl-1-butene units, 1-pentene units, 1-hexene units, 3-methyl-1-pentene units, 4-methyl-1-pentene units, 1-heptene units, 1-octene units, and the like. Among these, ethylene units and propylene units are desired.

The olefinic resin may be a homopolymer of an alkene, a copolymer of two or more alkenes, or a copolymer of an alkene and a monomer other than alkenes. The monomer unit content other than alkene units in the copolymer of an alkene and a monomer other than alkenes is desirably 50 mol % or less, more desirably 30 mol % or less, still more desirably 10 mol % or less of the all monomer units in the olefinic resin.

Specific examples of olefinic resins include polyethylenes such as very low density polyethylene (VLDPE) with a density of lower than 0.910 $g/cm^3$, low density polyethylene (LDPE) with a density of 0.910 $g/cm^3$ or larger and 0.920 $g/cm^3$ or lower, middle density polyethylene (MDPE) with a density of higher than 0.920 $g/cm^3$ and lower than 0.942 $g/cm^3$, high density polyethylene (HDPE) with a density of 0.942 $g/cm^3$ or larger and 0.960 $g/cm^3$ or lower, linear low density polyethylene (L-LDPE), and ultra-high molecular weight polyethylene (UHMW-PE); polypropylenes such as atactic polypropylene, isotactic polypropylene, syndiotactic polypropylene, hemiisotactic polypropylene, and stereoblock polypropylene; polybutene; poly(3-methyl-1-butene); poly(3-methyl-1-pentene); poly(4-methyl-1-pentene); ethylene/α-olefin copolymers such as an ethylene/propylene copolymer; an ethylene/1-butene copolymer, an ethylene/propylene/1-butene copolymer, an ethylene/1-hexene copolymer or an ethylene/1-octene copolymer; an ethylene/vinyl acetate copolymer (EVA); an ethylene/vinyl alcohol copolymer (EVOH); an ethylene/(meth)acrylic acid copolymer; an ethylene/(meth)acrylic acid ester copolymer; an ethylene/vinyl chloride copolymer; an ethylene/tetrafluoroethylene copolymer; an ethylene/styrene copolymer; and the like.

The melt flow rate (MFR) of the olefinic resin is not particularly restricted and for example, 0.2 g/10 min or higher and 200 g/10 min or lower, desirably 10 g/10 min or higher and 200 g/10 min or lower, and more desirably 20 g/10 min or higher and 180 g/10 min or lower. The MFR may be measured in accordance with a known method. For example, the MFR of polyethylene may be measured according to JIS K 6922-1:2018, and the MFRs of other olefinic resins may be measured according to JIS K 7210-1:2014.

The olefinic resin is available by synthesizing the olefinic resin by a known method. Alternatively, a commercially available olefinic resin may be used. The olefinic resin may be a plant-based olefinic resin. The olefinic resin may be a recycled product.

Polyethylene and polypropylene are desired as the olefinic resin from the viewpoint of the versatility of a porous material obtained.

The solvent used is not particularly restricted as long as a mixture phase can be formed with an olefinic resin at least under pressure. Suitable examples of the solvent include hydrocarbon compounds, and specific examples of the hydrocarbon compounds include alkanes, aryls (such as benzene), alkylaryl compounds (such as toluene), and the like. Suitable hydrocarbon compounds include alkanes that are liquid under normal temperatures (particularly 25° C.), such as pentane, hexane, heptane, octane, and nonan. Among them, C5-7 alkanes are desired because boiling points are low and C5-7 alkanes are easy to remove, and pentane is more desired.

The amount of the solvent used with respect to the olefinic resin is not particularly restricted as long as these mixture phases can be formed. The amount of the solvent used is, for example, 3 parts by mass or more and 1000 parts by mass or less with respect to 1 part by mass of the olefinic resin, desirably 5 parts by mass or more and 500 parts by mass or less, and more desirably 5 parts by mass or more and 200 parts by mass or less. The porous structure of the obtained porous material can be changed by changing the amount of the solvent used with respect to the olefinic resin.

It should be noted that other components than the olefinic resin and the solvent may be added to the pressure-resistant container within the range that does not significantly impair the effect of the present disclosure.

The mixture phase preparation step may be, for example, carried out in the following manner. First, an introduction tube for introducing high pressure carbon dioxide is connected to a pressure-resistant container. When the pressure-resistant container is not provided with any heating means, a heating device is installed. A stirring device, a thermometer, or a pressure gauge may be installed to the pressure-resistant container according to need.

A given amount of an olefinic resin and a given amount of a solvent are put in the pressure-resistant container, and the pressure-resistant container is tightly sealed. Next, the pressure-resistant container is heated so that a single phase in which an olefinic resin and a solvent are mixed each other will be formed. At this time, the pressure-resistant container is stirred according to need. The heating temperature is not particularly restricted as long as a single phase can be formed and may be appropriately selected according to the types of the olefinic resin and the solvent used. The heating temperature is desirably a temperature equal to or higher than the boiling point of the solvent, and more desirably 70° C. or higher and 160° C. or lower. The porous structure of a porous material obtained can be changed by changing the heating temperature.

Thus, a single phase in which an olefinic resin and a solvent are mixed each other (that is, a homogeneous phase) can be obtained in the manner stated above.

Next, the carbon dioxide introduction step is described. In this step, high pressure carbon dioxide is introduced in the pressure-resistant container. Carbon dioxide has characteristics that it is a poor solvent of olefinic resins.

The pressure in the pressure-resistant container increases by introducing the high pressure carbon dioxide into the pressure-resistant container. Here, introducing the high pressure carbon dioxide is carried out such that the pressure in the pressure-resistant container reaches 6 MPa or higher. Therefore, the pressure of the high pressure carbon dioxide introduced is a pressure such that a pressure in the pressure-resistant container will be 6 MPa or higher. The high pressure carbon dioxide introduced is desirably carbon dioxide in a supercritical state. In other words, it is carbon dioxide having a temperature and pressure equal to or higher than its critical point. It should be noted that, regarding the critical point of carbon dioxide, the critical temperature is 31.1° C., and the critical pressure is 7.38 MPa.

A supercritical state is a state where gas and liquid are indistinguishable. Therefore, a substance in a supercritical state has both characteristics (particularly diffusibility) of gas and characteristics (particularly solubility) of liquid. Therefore, when carbon dioxide introduced is in a supercritical state, carbon dioxide is easy to penetrate and diffuse into a mixture phase of an olefinic resin and a solvent, and therefore, the olefinic resin is easy to be porous.

The temperature of the high pressure carbon dioxide introduced is not particularly restricted and, for example, 10° C. or higher and 150° C. or lower, and desirably 15° C. or higher and 50° C. or lower.

In the carbon dioxide introduction step, the pressure in the pressure-resistant container is desirably 7 MPa or higher and more desirably 8 MPa or higher. Meanwhile, the pressure in the pressure-resistant container is desirably 30 MPa or lower, more desirably 20 MPa or lower, and still more desirably 15 MPa or lower.

In the carbon dioxide introduction step, the time to keep the pressure-resistant container at 6 MPa or higher is not particularly restricted. A porous material can be obtained when the pressure of the pressure-resistant container reaches 6 MPa or higher. The time to keep the pressure-resistant container at 6 MPa or higher is desirably shorter from the production efficiency viewpoint, and specifically, a range from 0 seconds to about 5 minutes is desired.

After the carbon dioxide introduction step and before the pressure release step, a step for cooling a pressure-resistant container (hereinafter referred to as a "cooling step") may be carried out. A porous material can be obtained without the cooling step. However, carrying out the cooling step is advantageous because porous skeletons generated by the solidification of an olefinic resin can be rapidly kept. Cooling may be carried out by using a refrigerant or the like, or alternatively, by standing to cool. Cooling is desirably carried out in a short time. Therefore, cooling is desirably carried out by using a refrigerant or the like.

The temperature in the pressure-resistant container when the cooling step is finished is not particularly restricted, and for example, 90° C. or lower, desirably 70° C. or lower, and more desirably 50° C. or lower.

Next, the pressure release step is described. The pressure in the pressure-resistant container is increased to 6 MPa or higher by high pressure carbon dioxide. In this step, the pressure in the pressure-resistant container is released. In other words, the pressure in the pressure-resistant container is reduced in this step. In the pressure release step, the pressure is normally decreased to ordinary pressure (that is, atmospheric pressure).

Specifically, carbon dioxide is released from the pressure-resistant container in the pressure release step. The solvent is vaporized, and the vaporized solvent is also released from the pressure-resistant container when the carbon dioxide is released from the pressure-resistant container. Therefore, the solvent can be removed (that is, dried) by releasing the pressure in the pressure-resistant container in the pressure release step.

A porous material of the olefinic resin can be obtained in the pressure-resistant container by carrying out the steps described above. The porous material can be recovered by taking out the porous material from the pressure-resistant container.

A specific example for carrying out the production method of the present disclosure is described with reference to the drawings. In FIG. 1, a production system 100 of an olefinic resin porous material is schematically illustrated. First, this production system 100 of an olefinic resin porous material is explained. The production system 100 illustrated in FIG. 1 is provided with a pressure-resistant container 10. The pressure-resistant container 10 is installed with a heater 20 and a stirring device 30.

The type of the heater 20 is not particularly restricted as long as the pressure-resistant container 10 can be heated, and may be a heater used by being wound around the pressure-resistant container 10, such as a wire heater and a silicon rubber heater; or a heater using a heat transfer medium, such as water vapor, heat transfer oil, or hot water. Alternatively, the heater 20 may be an electric heater built in the pressure-resistant container 10.

For example, the stirring device 30 is provided with a motor and stirring blades. The constitution of the stirring device 30 is not particularly restricted as long as the interior of the pressure-resistant container 10 can be stirred and may be appropriately selected according to the size of the pressure-resistant container 10. For example, when the pressure-resistant container 10 is small, the stirring device 30 may be a stirring bar and a magnetic stirrer, and the like.

A carbon dioxide gas cylinder 40 is connected to the pressure-resistant container 10. A drying pipe 51, a cooling device 52, a filter 53, a booster pump 54, a first pressure gauge 55, a first safety valve 56, a pre-heating tube 57, and a check valve 58 are disposed in the carbon dioxide channel 50 between the pressure-resistant container 10 and the carbon dioxide gas cylinder 40. The carbon dioxide channel 50 may be configured in accordance with a known method. For example, a chiller or the like may be used as the cooling device 52. For example, a syringe pump, a diaphragm pump, or the like may be used as the booster pump 54. In addition, a valve V1, a valve V2, and a valve V3 are disposed in the carbon dioxide channel 50. The valve V1 is a back pressure valve. The part from the carbon dioxide gas cylinder 40 to the valve V2 functions as a booster part.

The carbon dioxide channel 50 branches into two channels on the downstream side of the valve V3, and one of the branched channels is connected to the pressure-resistant container 10. The other of the branched channel is provided with a second pressure gauge 60 and a second safety valve 61.

Meanwhile, the pressure-resistant container 10 is installed with an exhaust pipe 70 for releasing the pressure. The exhaust pipe 70 is provided with an exhaust valve V4 and a gas flowmeter 71. For example, a wet gas flowmeter may be used as the gas flowmeter 71.

Next, an example of the method for carrying out each step of the production method of the present disclosure using the production system 100 is described. First, the mixture phase preparation step may be carried out in the following manner. In the production system 100, the valves V2 to V4 and the safety valves 56, 61 are closed. A given amount of an olefinic resin and a given amount of a solvent are charged in the pressure-resistant container 10, and the pressure-resistant container is tightly sealed. The pressure-resistant container is heated with a heater 20 while stirring with a stirring device 30 to form a mixture phase of the olefinic resin and the solvent. After the mixture phase is obtained, the stirring blades of the stirring device 30 are pulled out from the mixture phase.

Next, the carbon dioxide introduction step may be carried out in the following manner. The valve of the carbon dioxide gas cylinder 40 is opened, and liquidized carbon dioxide gas (that is, liquid carbon dioxide) is sent to the carbon dioxide channel 50. The liquid carbon dioxide passes the drying pipe 51 and unnecessary moisture is removed. Then, the liquid carbon dioxide is cooled by a cooling device 52 to a fully liquid state. The cooled liquid carbon dioxide is pressurized by the booster pump 54 to the critical pressure or higher. At this time, the pressure of the liquid carbon dioxide is adjusted by the valve V1, which is a back pressure valve, and the pressure is checked through the first pressure gauge 55. At this stage, the pressure of the carbon dioxide is equal to or higher than the critical pressure, but the temperature thereof is lower than the critical temperature.

The valve V2 is opened, and the liquid carbon dioxide pressurized to a given pressure is heated by the pre-heating tube 57 via the valve V2 to the critical temperature or higher. Carbon dioxide is thereby made into a supercritical state. The valve V3 is opened, and carbon dioxide in a supercritical state is supplied to a pressure-resistant container 10 via the valve V3. At this time, the backflow of carbon dioxide is prevented by the check valve 58. It should be noted that although carbon dioxide is made into a supercritical state in this example, carbon dioxide may not be made into a supercritical state in the production method of the present disclosure.

The pressure-resistant container 10 is pressurized by carbon dioxide in a supercritical state. The pressure at this time is checked through the second pressure gauge 60.

After pressurization, the pressure-resistant container 10 may be cooled to, for example, 50° C. or lower by water cooling or the like. For example, this cooling may be carried out by soaking the pressure-resistant container 10 in an ice bus. When the pressure-resistant container 10 is provided with a jacket, a refrigerant may be introduced into the jacket and cool the pressure-resistant container 10.

The valve V3 is closed, and the valve V4 is opened to release the pressure in the pressure-resistant container 10 from the exhaust pipe 70. The pressure is slowly released. The pressure release step may be carried out in this way. Since the solvent removal is also carried out in the pressure release step, the olefinic resin porous material generates in the pressure-resistant container 10. The olefinic resin porous material is recovered by taking out the porous material from the pressure-resistant container 10.

In the production method of the present disclosure, carbon dioxide, which is a poor solvent of an olefinic resin, penetrates into the mixture phase of an olefinic resin and a solvent to form two separate phases, and as a result, the olefinic resin porous material can be obtained. Thus, the olefinic resin porous material can be obtained using phase separation without stretching. Here, the form of the two separate phases changes depending on the amount of the olefinic resin with respect to the solvent, the temperature of the prepared single phase, and the like.

Accordingly, the present disclosure has an advantage that olefinic resin porous materials having various porous structures can be obtained based on various phase separation structures depending on conditions. Specifically, olefinic resin porous materials having the following structures can be obtained. It should be noted that the olefinic resin porous material typically only consists of an olefinic resin or olefinic resins.

(1) Modulated Structure

Two separation phases are known to form a modulated structure. A modulated structure is a structure in which both two separate phases form a continuous phase and are intertwined with each other, and typically a structure formed by spinodal decomposition. Therefore, it is a structure formed inside the spinodal curve of FIG. 2 (particularly see the case of (b) in FIG. 2). In the present disclosure, a phase containing an olefinic resin and a phase containing carbon dioxide as two separate phases form a modulated structure, and a porous material based on this modulated structure can be obtained (as an example of a scanning electron micrograph (SEM) of an actual structure, see FIG. 3).

Specifically, the olefinic resin porous material includes an olefinic resin skeleton and pores communicating with one another in the skeleton, and the skeleton and the pores have an intertwined structure based on the modulated structure. The olefinic resin skeleton has a three-dimensional network structure. The pores have a three-dimensional network structure. For example, the olefinic resin skeleton can be formed by crystal particles of an olefinic resin joining one another.

(2) Sponge Structure

Two separation phases are known to be capable of forming a sea-island structure. A sea-island structure is a structure in which one phase forms a continuous phase, and the other phase is dispersed in the continuous phase as a plurality of discontinuous phases. Therefore, the sea-island structure is a structure formed outside the spinodal curve and inside the binodal curve of FIG. 2 (particularly see the case of (c) in FIG. 2). In the present disclosure, a sea-island structure having a phase containing an olefinic resin as a sea phase and a phase containing carbon dioxide as an island phase, wherein the island phase is formed substantially spherically is provided. The island phases can join one another, for example, when carbon dioxide and a solvent are released from the pressure-resistant container (as an example of a SEM image of an actual structure, see FIG. 7).

Specifically, the olefin resin porous material includes an olefin resin skeleton based on the sea phase in a sea-island structure (or corresponding to a sea phase) and bubble-shaped pores based on an island phase (or corresponding to the island phase). The olefinic resin skeleton has a recessed part corresponding to a part of the substantially spherical shape. Adjacent pores may be joined. That is, the pores may be continuous pores or may be closed-cell pores.

(3) Cauliflower-Like Structure

Figure 2:
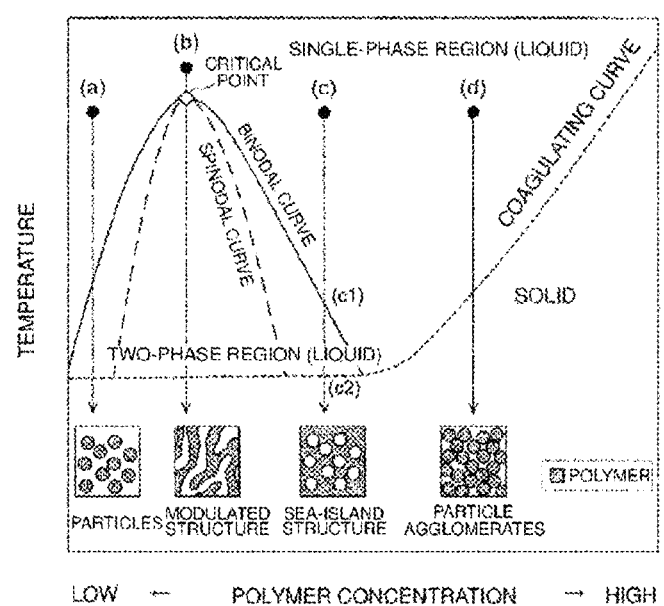
FIG. 2 is a polymer-solvent phase diagram.

As illustrated in FIG. 2, polymers aggregate into particles at high polymer concentrations outside the binodal curve (particularly see the case of (d) in FIG. 2). In the present disclosure, a structure, in which particulate particles (primary particles) join one another to constitute secondary particles, and these secondary particles join one another, can be formed. Since the gaps between particles form voids, this structure is porous. This structure has a shape similar to the appearance of cauliflowers. This structure can be a fractal structure (as an example of a SEM image of an actual structure, see FIG. 5).

Specifically, the olefinic resin porous material includes an olefinic resin skeleton and pores communicating with one another in the skeleton. The olefinic resin skeleton is formed by primary particles of an olefinic resin joining one another to form secondary particles and the secondary particles joining one another. For example, the primary particles of an olefinic resin are crystal particles of an olefinic resin.

(4) Particles Joining Structure

As illustrated in FIG. 2, polymers aggregate into particles at high polymer concentrations outside the binodal curve (particularly see the case of (d) in FIG. 2). In the present disclosure, a structure in which primary particles are joined is provided. Since the gaps between particles form voids, this structure is porous (as an example of a SEM image of an actual structure, see FIG. 8).

Specifically, the olefinic resin porous material is formed by primary particles of an olefinic resin joining one another. For example, the primary particles are crystal particles of an olefinic resin.

According to the present disclosure, a porous material having two or more structures out of the above (1) to (4) can be obtained. As a specific example of such a porous material, an olefinic resin porous material having a cauliflower-like structure in the upper part and a modulated structure in the lower part.

Furthermore, according to the present disclosure, a porous material with a mixed structure of two or more of the above (1) to (4) can be obtained. Specific examples of such a porous material include an olefin resin skeleton in which olefinic resin particles join one another and the particles have an olefin resin region based on the sea phase in a sea-island structure (or corresponding to a sea phase) and a bubble-shaped pore region based on an island phase (or corresponding to the island phase). In other words, the olefinic resin porous material includes a skeleton in which spongy olefinic resin granular bodies are joined.

Unlike the stretching method, which is a common production method of olefinic resin porous materials, a porous material with a large thickness (for example, a porous material with all dimensions in three directions, namely, vertical, horizontal, and thickness dimensions, being 1 mm or larger, 5 mm or larger, and 10 mm or larger, respectively) can be obtained according to the present disclosure. The dimensions of an obtained olefinic resin porous material can be adjusted depending on the inner shape of a pressure-resistant container and the amount of an olefinic resin used. The olefinic resin porous material obtained can be processed into a given dimension by cutting or the like according to the application.

An olefinic resin porous material obtained by the present disclosure may be used in a battery separator such as a separator for lithium ion secondary batteries and a separator for nickel-hydrogen batteries; a membrane filter such as a reverse osmosis membrane, an ultrafiltration membrane, and a microfiltration membrane; a breathable-waterproof garment; a packaging material; a construction material; a sound-absorbing material; a cleaning tool; a make-up tool; and the like.

EXAMPLES

Hereinafter, examples relating to the present disclosure will be described, but the present disclosure is not intended to be limited to those shown in such examples.

Example 1

As an experimental device, an olefinic resin porous material production system illustrated in FIG. 1 mentioned above was prepared. As an olefinic resin, polyethylene ("Petrocene 353", produced by TOSOH CORPORATION, density: 0.915 g/cm$^3$, MFR: 145 g/10 min, melting temperature: 98° C.) was prepared. A pressure-resistant container was charged with 1 g of this polyethylene and 9 g of n-pentane, and heated to 85° C. while stirring. A mixture phase of polyethylene and pentane was obtained in this way.

Carbon dioxide supplied from a carbon dioxide gas cylinder was converted into a supercritical state in a pressurizing part of the olefinic resin porous material production system and introduced into a pressure-resistant container. At this time, the pressure in the pressure-resistant container was adjusted to 10 MPa.

Figure 3:
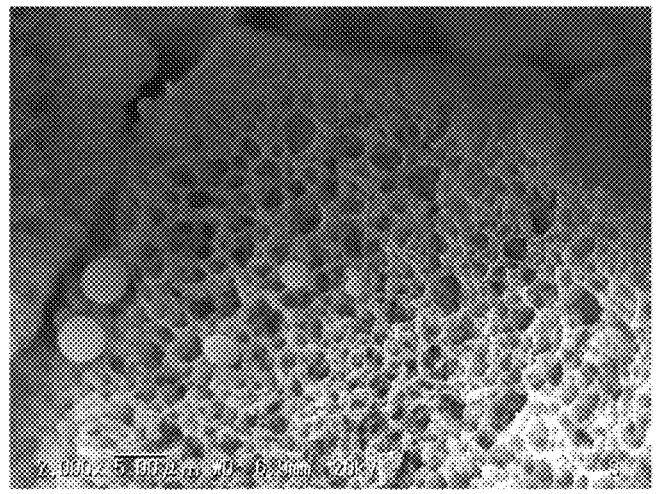
FIG. 3 is a SEM image of the polyethylene porous material obtained in Example 1.

After that, the pressure-resistant container was cooled by water cooling to 50° C. Next, the pressure in the pressure-resistant container was released over 20 minutes. When the inside of the pressure-resistant container reached room temperature and ordinary pressure, the pressure-resistant container was opened, and a white product was recovered. Observation of this product by a scanning electron microscope (SEM) revealed that this product was porous. As a reference, the SEM image thereof is shown in FIG. 3. FIG. 3 shows that the porous material obtained in Example 1 had a three-dimensional network structure in which olefinic resin skeletons and pores are intertwined on the basis of a modulated structure.

Example 2

Figure 4:
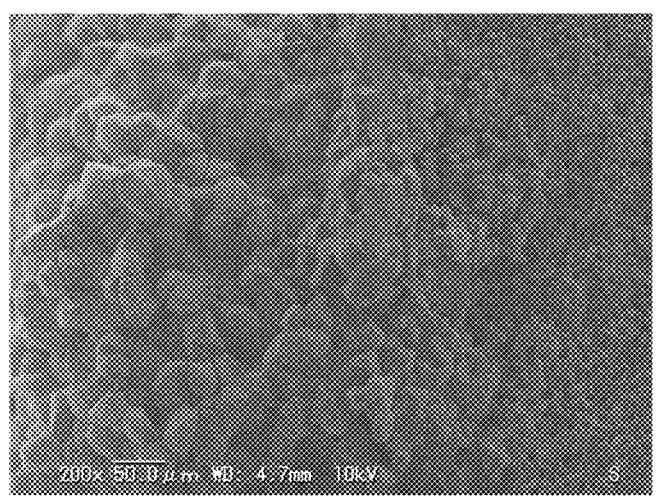
FIG. 4 is a SEM image of the polyethylene porous material obtained in Example 2.
Figure 5:
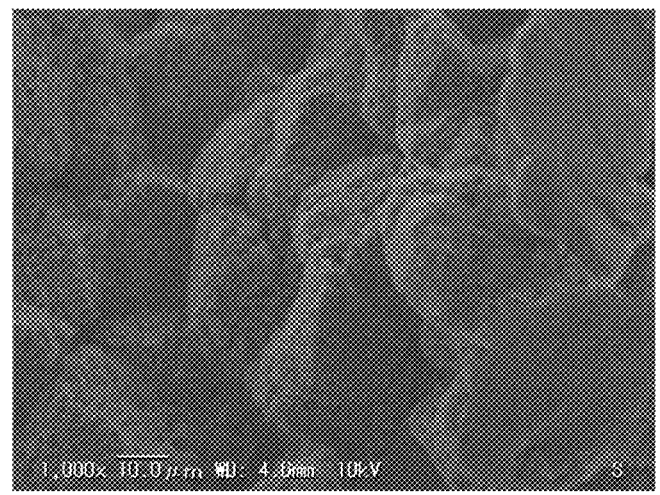
FIG. 5 is an enlarged SEM image of the upper part of the polyethylene porous material obtained in Example 2.
Figure 6:
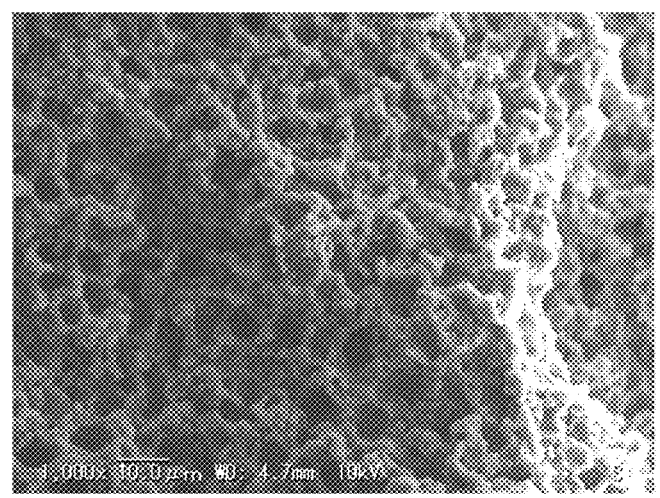
FIG. 6 is an enlarged SEM image of the lower part of the polyethylene porous material obtained in Example 2.

A white product was obtained by the same method as Example 1 except that the amount of n-pentane was changed from 9 g to 10 g. Observation of this product by an SEM revealed that this product was porous. As a reference, the SEM images thereof are shown in FIGS. 4 to 6. FIG. 4 is a SEM image of a side surface of the porous material. The left side of the image represents the upper part of the porous material, and the right side of the image represents the lower part of the porous material. FIG. 5 is a SEM image of the upper part of the porous material, and FIG. 6 is a SEM image of the lower part of the porous material. FIGS. 4 to 6 show that the porous material obtained in Example 2 had, in the upper part, a cauliflower-like structure in which particles join to form larger particles, and these large particles join, and in the lower part, a three-dimensional network structure based on a modulated structure.

Example 3

Figure 7:
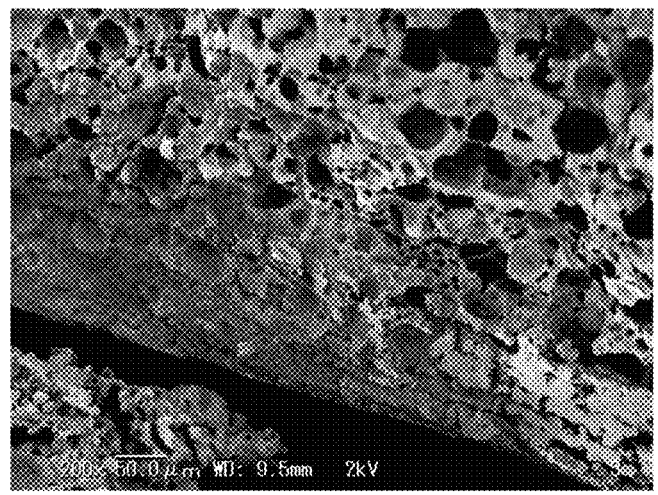
FIG. 7 is a SEM image of the polyethylene porous material obtained in Example 3.

A white product was obtained by the same method as Example 1 except that the amount of n-pentane was changed from 9 g to 20 g. Observation of this product by a SEM revealed that this product was porous. As a reference, the SEM image thereof is shown in FIG. 7. FIG. 7 shows that the porous material obtained in Example 3 had a sponge-shaped porous structure.

Example 4

Figure 8:
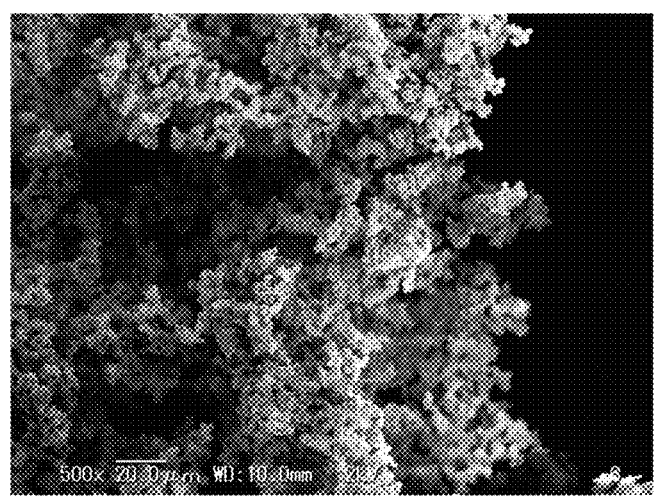
FIG. 8 is a SEM image of the polyethylene porous material obtained in Example 4.

A white product was obtained by the same method as Example 1 except that the amount of n-pentane was changed from 9 g to 50 g. Observation of this product by a SEM revealed that this product was porous. As a reference, the SEM image thereof is shown in FIG. 8. FIG. 8 shows that the porous material obtained in Example 4 had a porous structure formed by particulate polyethylene joining together.

Example 5

Figure 9:
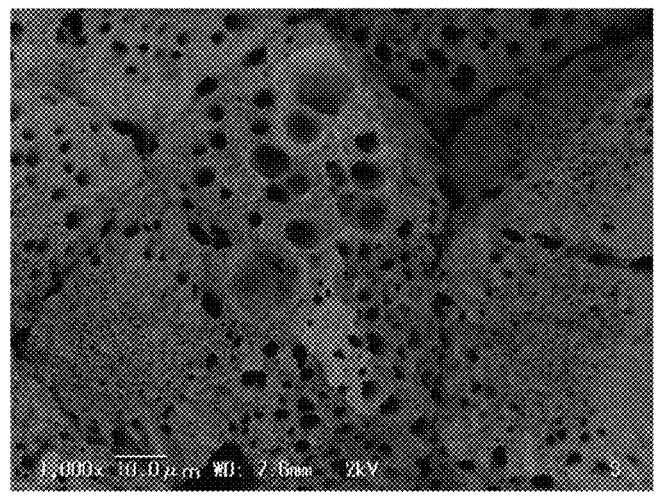
FIG. 9 is a SEM image of the polyethylene porous material obtained in Example 5.

A white product was obtained by the same method as Example 1 except that the amount of n-pentane was changed from 9 g to 10 g, and the heating temperature for forming a mixture phase was changed from 85° C. to 115° C. Observation of this product by a SEM revealed that this product was porous. As a reference, the SEM image thereof is shown in FIG. 9. FIG. 9 shows that the porous material obtained in Example 5 had a sponge-shaped porous structure.

Example 6

Figure 10:
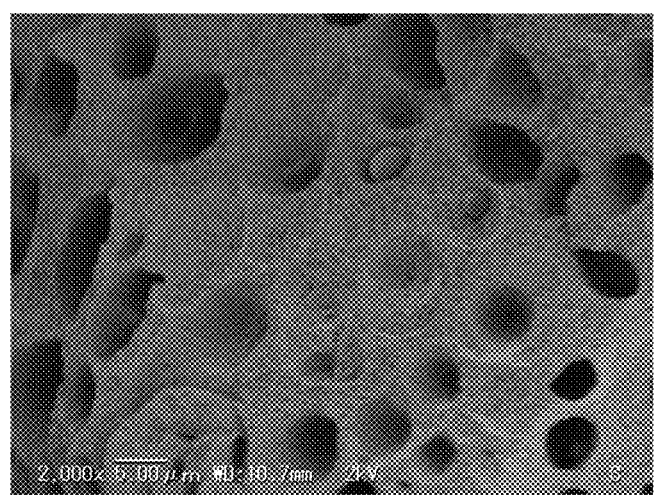
FIG. 10 is a SEM image of the polyethylene porous material obtained in Example 6.

A white product was obtained by the same method as Example 1 except that the amount of n-pentane was changed from 9 g to 10 g, and the heating temperature for forming a mixture phase was changed from 85° C. to 150° C. Observation of this product by a SEM revealed that this product was porous. As a reference, the SEM image thereof is shown in FIG. 10. FIG. 10 shows that the porous material obtained in Example 6 had a sponge-shaped porous structure.

Example 7

As an experimental device, an olefinic resin porous material production system illustrated in FIG. 1 mentioned above was prepared. As the olefinic resin, polypropylene ("J137G" produced by Prime Polymer Co., Ltd., MFR: 30 g/10 min) was prepared. A pressure-resistant container was charged with 0.5 g of this polypropylene, together with 20 g of n-pentane, and heated to 150° C. while stirring. A mixture phase of polypropylene and pentane was obtained in this way.

Carbon dioxide supplied from a carbon dioxide gas cylinder was converted into a supercritical state in a pressurizing part of the olefinic resin porous material production system and introduced into a pressure-resistant container. At this time, the pressure in the pressure-resistant container was adjusted to 10 MPa.

Figure 11:
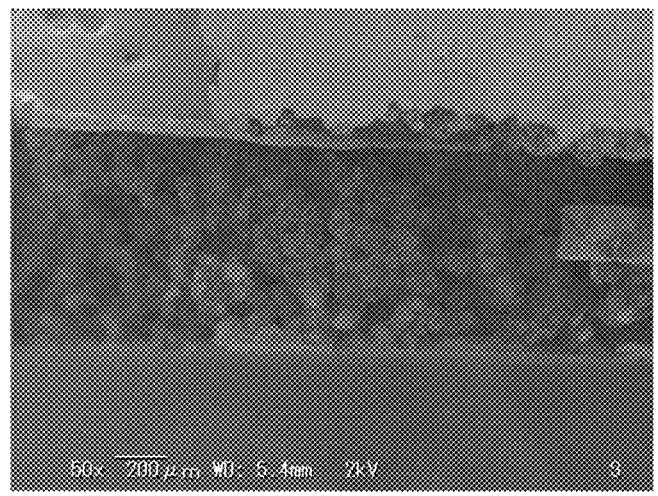
FIG. 11 is a SEM image of the polypropylene porous material obtained in Example 7.

After that, the pressure-resistant container was cooled by water cooling to 50° C. Next, the pressure in the pressure-resistant container was released over 20 minutes. When the inside of the pressure-resistant container reached room temperature and ordinary pressure, the pressure-resistant container was opened, and a white product was recovered. Observation of this product by a SEM revealed that this product was porous. As a reference, the SEM image thereof is shown in FIG. 11. FIG. 11 shows that the porous material obtained in Example 7 had a porous structure in which sponge-shaped particles joined.

Example 8

Figure 12:
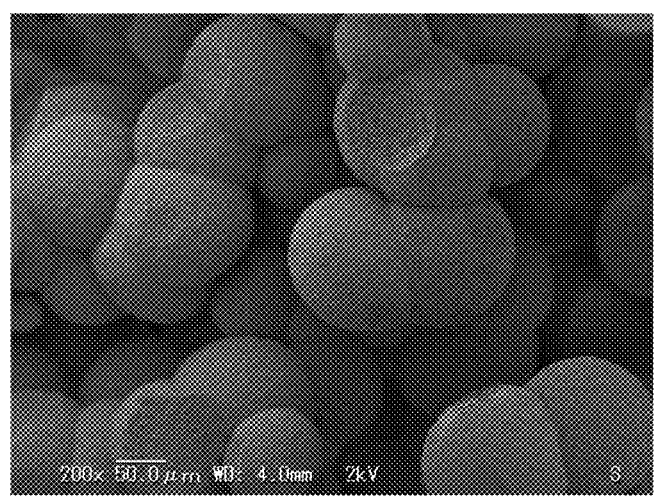
FIG. 12 is a SEM image of the polypropylene porous material obtained in Example 8.

A white product was obtained by the same method as Example 7 except that the amount of n-pentane was changed from 20 g to 30 g. Observation of this product by a SEM revealed that this product was porous. As a reference, the SEM image thereof is shown in FIG. 12. FIG. 12 shows that the porous material obtained in Example 8 had a porous structure formed by particulate polypropylene joining together.

Example 9

Figure 13:
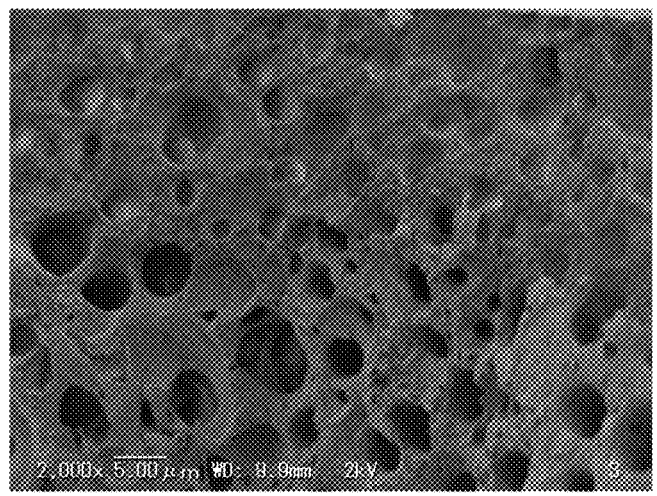
FIG. 13 is a SEM image of the polypropylene porous material obtained in Example 9.

A white product was obtained by the same method as Example 7 except that the amount of polypropylene was changed from 0.5 g to 0.1 g. Observation of this product by a SEM revealed that this product was porous. As a reference, the SEM image thereof is shown in FIG. 13. FIG. 13 shows that the porous material obtained in Example 9 had a sponge-shaped porous structure.

Example 10

A white product was obtained by the same method as Example 7 except that the amount of polypropylene was changed from 0.5 g to 0.05 g. Observation of this product by a SEM revealed that this product had a porous structure formed by particulate polypropylene joining together.

Example 11

A white product was obtained by the same method as Example 2 except that the pressure in the pressure-resistant container was increased to 6 MPa by introducing carbon dioxide. Observation of this product revealed that this product was porous.

Comparative Example 1

A white product was obtained by the same method as Example 2 except that the pressure in the pressure-resistant container was increased to 3 MPa by introducing carbon dioxide. Observation of this product revealed that no porous structure was found.

The above results revealed that an olefinic resin porous material can be produced by preparing a single phase containing a mixture of an olefinic resin and a solvent in a pressure-resistant container, introducing high pressure carbon dioxide into the pressure-resistant container such that the pressure in the pressure-resistant container reaches 6 MPa or higher, and then releasing the pressure in the pressure-resistant container. That is, the results reveal that a novel method for producing an olefinic resin porous material is provided according to the present disclosure. Furthermore, according to the present disclosure, it is found that various porous structures such as a porous structure based on a modulated structure, a sponge-shaped porous structure, a cauliflower-like porous structure, a porous structure in which particles join can be formed depending on conditions.

What is claimed is:

1. A method for producing an olefinic resin porous material, comprising the steps of:
   preparing a single phase in which an olefinic resin and a solvent are mixed with each other, in a pressure-resistant container, by heating the olefinic resin and the solvent to a temperature equal to or higher than a boiling point of the solvent, the boiling point being a boiling point under one atmosphere;
   introducing high pressure carbon dioxide into the pressure-resistant container; and
   releasing a pressure in the pressure-resistant container, wherein
   introducing the high pressure carbon dioxide is carried out such that a pressure in the pressure-resistant container reaches 6 MPa or higher.

2. The production method according to claim 1, wherein the high pressure carbon dioxide introduced in the pressure-resistant container is carbon dioxide in a supercritical state.

3. The production method according to claim 1, wherein the olefinic resin is polyethylene or polypropylene.

4. The production method according to claim 1, wherein the solvent is n-pentane.

* * * * *